US012657925B2

(12) United States Patent
Huang

(10) Patent No.: US 12,657,925 B2
(45) Date of Patent: Jun. 16, 2026

(54) SURVEILLANCE CAMERA APPLICABLE TO BEING USED IN VEHICLE AND EASILY TAKEN AND PLACED, AND CENTER CONSOLE DISPLAY

(71) Applicant: Shenzhen Xinzhou Industrial Co., Ltd., Shenzhen (CN)

(72) Inventor: Kaiquan Huang, Yangxin (CN)

(73) Assignee: Shenzhen Xinzhou Industrial Co., Ltd., Shenzhen (CN)

( * ) Notice: Subject to any disclaimer, the term of this patent is extended or adjusted under 35 U.S.C. 154(b) by 0 days.

(21) Appl. No.: 18/900,897

(22) Filed: Sep. 30, 2024

(65) Prior Publication Data

US 2025/0022283 A1     Jan. 16, 2025

(30) Foreign Application Priority Data

Nov. 16, 2023    (CN) .......................... 202323088963.5

(51) Int. Cl.
| | |
|---|---|
| *G06V 20/56* | (2022.01) |
| *H04N 23/11* | (2023.01) |
| *H04N 23/55* | (2023.01) |
| *H04N 23/66* | (2023.01) |
| *H04N 23/695* | (2023.01) |
| *H04N 23/74* | (2023.01) |

(52) U.S. Cl.
CPC ............. *G06V 20/56* (2022.01); *H04N 23/11* (2023.01); *H04N 23/55* (2023.01); *H04N 23/66* (2023.01); *H04N 23/695* (2023.01); *H04N 23/74* (2023.01)

(58) Field of Classification Search
CPC ........ G06V 20/56; H04N 23/11; H04N 23/55; H04N 23/66; H04N 23/695; H04N 23/74
See application file for complete search history.

(56) References Cited

U.S. PATENT DOCUMENTS

| | | | |
|---|---|---|---|
| 2019/0287359 A1 | 9/2019 | Kondou et al. | |
| 2019/0387180 A1 | 12/2019 | Ogata et al. | |
| 2020/0244845 A1* | 7/2020 | Rukes .................... | F16M 11/14 |
| 2021/0272432 A1 | 9/2021 | Omata et al. | |
| 2023/0388629 A1* | 11/2023 | Chen ...................... | H04N 23/90 |

FOREIGN PATENT DOCUMENTS

| | | | | |
|---|---|---|---|---|
| CN | 216700141 U | * | 6/2022 | |
| DE | 19724411 A1 | * | 1/1998 | ............. H04N 23/50 |
| KR | 20160009749 A | * | 1/2016 | ........... H05K 7/2039 |

* cited by examiner

*Primary Examiner* — Michael Lee
(74) *Attorney, Agent, or Firm* — Hemisphere Law, PLLC

(57) ABSTRACT

The present disclosure relates to a surveillance camera applicable to being used in a vehicle and easily taken and placed, including a camera assembly; the camera assembly includes a bottom shell, a control board arranged in the bottom shell, and a battery electrically connected to the control board; the control board is provided with a camera for monitoring; the camera assembly includes an outer shell; the outer shell and the bottom shell fix the battery and the control board inside the bottom shell. By use of a universal ball for connection, it is convenient to adjust a monitoring angle of the surveillance camera and to remove the surveillance camera. The camera assembly is provided with an infrared lamp and a photosensor, to facilitate monitoring in a dark environment.

16 Claims, 4 Drawing Sheets

SURVEILLANCE CAMERA APPLICABLE TO BEING USED IN VEHICLE AND EASILY TAKEN AND PLACED, AND CENTER CONSOLE DISPLAY

TECHNICAL FIELD

The present disclosure relates to the field of surveillance cameras used in vehicles, and in particular, to a surveillance camera applicable to being used in a vehicle and easily taken and placed, and a center console display.

BACKGROUND

With the development of the national economy and the continuous improvement of the living standard, more and more families have their own cars. The popularization of cars has brought convenience to work and life of people, but there are also some potential safety hazards. When driving out with a child, a driver needs to place the child in a child seat to secure the child in a rear seat. The child is short and may easily fall asleep in the driving car, and a seat back blocks the line of sight of the driver, so that the driver may not easily realize the presence of the child after parking the car. A careless driver may forget the child in the car. This is dangerous. In addition, when a person drives a car and places a child in a rear seat, the person may not monitor and view the state of the child and may not learn about the state of the child in real time to make a response in time. This is risky. An existing camera and an existing center console display are both connected in a wired manner based on digital-analog signals, so that there are disordered wires.

The Chinese patent publication number CN218661469U relates to a security monitoring device for children stranded in vehicles. The present disclosure provides a security monitoring device for a child left in a vehicle, which communicates with a mobile phone terminal through a wireless communication module to enable people to timely know a situation inside the vehicle. The security monitoring device for the child left in the vehicle includes a base, a safety belt, a child seat body, two brackets, a swing block, a camera, and the like. A middle part of an upper part of the base is connected to the safety belt; a top of the base is connected with the child seat body; the two brackets are connected to a right side of the base; the swing block is rotatably connected between right parts of the two brackets; the camera is mounted on the swing block; and a gas detection sensor, a temperature sensor, a human body infrared sensor, and a positioning module are arranged in the camera. An alarm unit communicates with a mobile phone terminal through a wireless communication module to sound an alarm, so that people know in a timely manner about a situation in the vehicle. The surveillance camera is fixedly arranged on the child seat, which cannot guarantee a long battery life of the surveillance camera. Furthermore, by using the camera for photographing, people need to view images of the camera, so that it is inconvenient.

Chinese Patent No. CN203819125U discloses a detection and alarm device for a child in a vehicle, including: infrared emitters, infrared receivers, a camera, and a control device. The emitters and the receivers are respectively arranged on two sides of seats. Positions of the emitter and the receiver in each pair are in one-to-one correspondence. The camera is arranged on a roof in the vehicle. The control device is arranged in the vehicle and is respectively connected to the infrared emitters, the infrared receivers, the camera, and an automobile console. The control device controls the camera.

The control device transmits data through a wireless network and is connected to the receiver. Beneficial effects of the present disclosure are that the infrared sensor is used to detect whether a child is in the vehicle, and whether there is a false alarm is confirmed through the camera, thereby avoiding suffocation of a child being trapped in the vehicle. This device only monitors whether there is a child inside a vehicle after the vehicle engines off, and cannot achieve real-time viewing of the state of a child during driving.

SUMMARY

The technical problems to be solved in the present disclosure are as follows: An existing camera for monitoring a child in a child seat in a vehicle has a short battery life, and it is inconvenient to remove the camera to view monitored images. The monitored images cannot be roughly observed in real time during driving. Furthermore, the existing camera and an existing center console display are both connected in a wired manner based on digital-analog signals, so that there are disordered wires. With respect to the above defects in the prior art, a surveillance camera applicable to being used in a vehicle and easily taken and placed, and a center console display are provided.

T solve the above technical problems, the present disclosure adopts the following technical solutions:

A surveillance camera applicable to being used in a vehicle and easily taken and placed is provided, including a camera assembly, wherein the camera assembly includes a bottom shell, and a control board arranged in the bottom shell; the control board is provided with a camera for monitoring; the camera assembly further includes an outer shell; the outer shell and the bottom shell fix the control board inside the bottom shell; the surveillance camera further includes a fixing assembly detachably connected to the camera assembly; one side of the fixing assembly is detachably connected to the camera assembly; and the other side of the fixing assembly is detachably connected and fixed in a vehicle to fix the surveillance camera inside the vehicle.

Preferably, the fixed assembly is connected to the camera assembly through a connecting portion; the connecting portion is detachably connected to the fixed assembly; and the connecting portion is integrally formed with the camera assembly.

Preferably, the connecting portion is detachably connected to the fixed assembly through a universal ball; the universal ball enables the camera assembly to rotate relative to the fixed assembly, to adjust a monitoring angle of the camera; the connecting portion further includes a rotating nut that locks the universal ball; two rotating handles are arranged on the rotating nut; and the rotating nut is tightened or loosened through the rotating handles.

Preferably, the fixed assembly includes a fixed base plate; one side of the fixed base plate is detachably connected to the camera assembly; and a detachable connector is arranged on the other side of the fixed base plate to fix the fixed assembly in the vehicle.

Preferably, the other side of the fixed base plate fixes the fixed assembly in the vehicle through a hook and loop fastener or a clip; hanging lugs are further arranged at a left end and a right end of the fixed base plate; and the fixed assembly is fixed in the vehicle through the hanging lugs or the strap.

Preferably, the hook and loop fastener is fixed on the fixed base plate through a hook and loop fastener adapter plate; the hook and loop fastener is adhered to the hook and loop fastener adapter plate; and the hook and loop fastener adapter plate is detachably connected to the fixed base plate.

Preferably, the control board is further provided with a photosensor and a plurality of groups of infrared lamps; the photosensor senses brightness of a monitoring environment to control turning on and turning off of the infrared lamps to activate a night vision function of the surveillance camera; through holes for allowing the infrared lamps and the photosensor to correspondingly pass through are provided in the outer shell; and the camera assembly further includes a battery for supplying power to the control board.

Preferably, a lamp housing is connected to an outer side of the outer shell; a light hole for the photosensor to sense a temperature of the monitoring environment is provided in the lamp housing; the outer shell is made of a semi-transparent material; the infrared lamps monitor the night vision function through the lamp housing; limiting ribs for limiting the battery and the control board are arranged in the bottom shell; a positioning hole and a fixing hole which are used for positioning the control board are further provided in the bottom shell; and a heat dissipation hole is provided in a side surface of the bottom shell.

A center console display used in conjunction with the surveillance camera described above is provided. The center console display communicates with the surveillance camera through wireless connection; and the center console display is placed on a center console for a driver to view images monitored by the surveillance camera in real time.

The present disclosure has the beneficial effects: The surveillance camera is fixed in the vehicle by the hook and loop fastener or the clip arranged on one side of the fixed assembly, which facilitates easy taking and placement of the surveillance camera at any time. Furthermore, if the performance of the hook and loop fastener or the clip is reduced, the hook and loop fastener or the clip is convenient to replace due to independent detachable connection. By use of a universal ball for connection, it is convenient to adjust a monitoring angle of the surveillance camera and to remove the surveillance camera. The camera assembly is provided with the infrared lamps and the photosensor, to facilitate monitoring in a dark environment. By cooperation with wireless transmission, monitored images are transmitted to the center console display, which facilitates viewing the monitored images of the surveillance camera, and especially facilitates monitoring a child in a rear child seat during driving. This product is more convenient to use. Long-time monitoring can be achieved tool due to the independent high-capacity battery. Furthermore, the detachable connection of the surveillance camera also facilitates charging of the battery.

BRIEF DESCRIPTION OF THE DRAWINGS

To describe the technical solutions in the embodiments of the present disclosure or in the prior art more clearly, the following will further explain the present disclosure in combination with the accompanying drawings and embodiments. The accompanying drawings in the following description show merely some embodiments of the present disclosure, and a person of ordinary skill in the art may still derive other drawings from the accompanying drawings without creative efforts.

DETAILED DESCRIPTION OF THE EMBODIMENTS

To make the objectives, technical solutions, and advantages of the embodiments of the present disclosure clearer, the technical solutions in the embodiments of the present disclosure are clearly and completely described below. Apparently, the described embodiments are merely some rather than all the embodiments of the present disclosure. All other embodiments obtained by a person of ordinary skill in the art based on the embodiments of the present disclosure without making creative efforts shall fall within the protection scope of the present disclosure.

Figure 1:
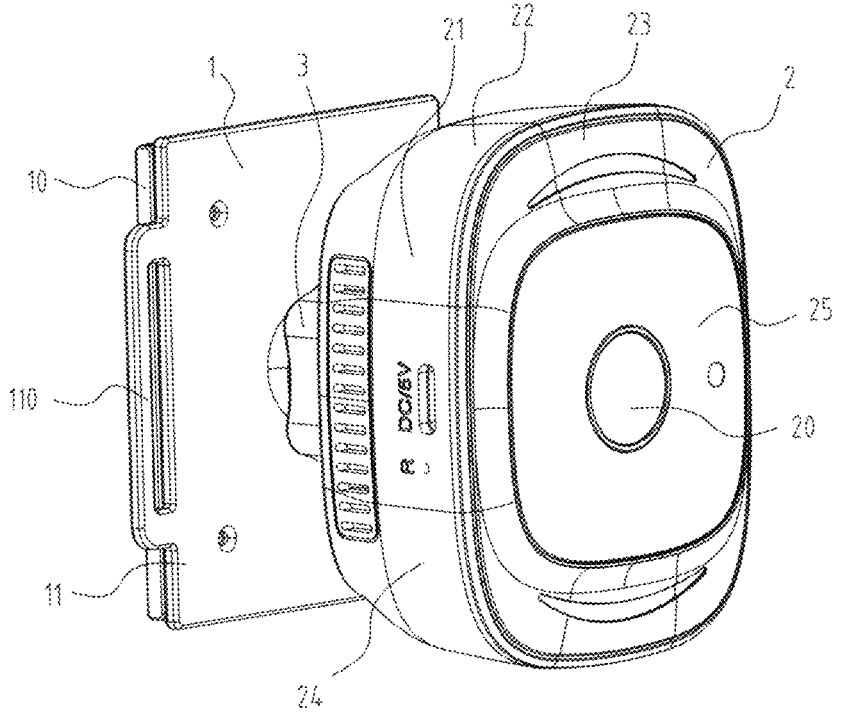
FIG. 1 is a three-dimensional structural diagram of a surveillance camera according to a preferred embodiment of the present disclosure.
Figure 2:
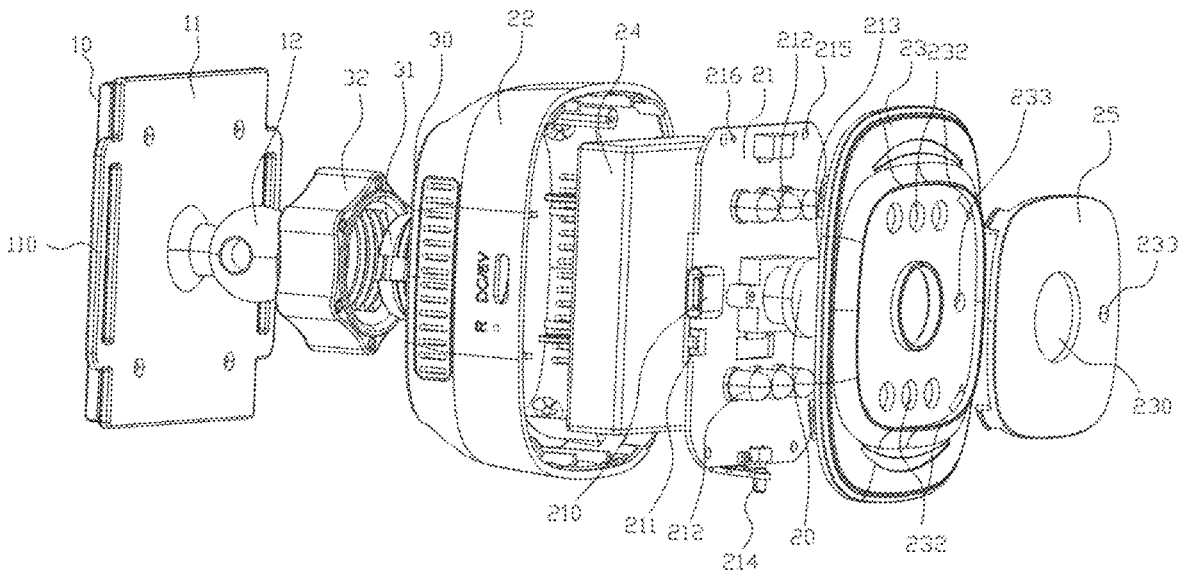
FIG. 2 is an exploded structural diagram of a surveillance camera according to a preferred embodiment of the present disclosure.

A surveillance camera applicable to being used in a vehicle and easily taken and placed according to a preferred embodiment of the present disclosure, as shown in FIG. 1-2, includes a camera assembly 2, and a fixed assembly 1 that fixes the camera assembly. The fixed assembly and the camera assembly are detachably connected through a connecting portion 3. The camera assembly 2 includes a bottom shell 22 that is detachably connected to the connecting portion. A control board 21, a battery 24 electrically connected to the control board, and a camera 20 fixed on the control board are arranged in the bottom shell. One side of the bottom shell is connected and fixed through an outer shell 23. The fixed assembly 1 includes a fixed base plate 11. One side of the fixed base plate is connected to the connecting portion, and a hook and loop fastener 10 is arranged on the other side. The camera can be taken and placed more conveniently through an adhesion effect of the hook and loop fastener. The camera can be placed in a rear seat of a vehicle to monitor a baby in a child seat. Monitored information is displayed in real time on a center console display, making it convenient to observe the state of the baby in the child seat during driving. It should be noted that in the present disclosure, the battery is arranged in the camera assembly, or power is supplied to the camera through a data cable. This should fall within the scope of protection of the present disclosure.

Specifically, as shown in FIG. 2, the control board 21 is provided with a reset button 211 for initializing the control board, a charging port 210 for charging the battery, and a pair button 214 for controlling the camera to be paired with the center console display. The camera is fixed on one side of the control board, and a plurality of infrared lamps 212 are arranged on this side. The infrared lamps are arranged on two sides of the camera, which can achieve video monitoring in a dark environment through the infrared lamps. A photosensor 213 is further provided. When the photosensor senses poor lighting, the infrared lamps can start to work, thereby enabling the camera to perform monitoring and photographing. The outer shell 23 is detachably connected to the bottom shell. The outer shell is provided with a camera hole 230 corresponding to the camera 20, infrared lamp holes 232 corresponding to the infrared lamps, and a photosensor hole 233 corresponding to the photosensor.

Further, as shown in FIG. 2, to avoid light from light sources of the infrared lamps from attracting the baby and affecting the eyesight of the baby, a light-transmitting mirror 25 is arranged on an outer side of the outer shell to cover the infrared lamps 212. The light-transmitting mirror 25 can be made of a polycarbonate (PC) material, and can achieve a light transmittance of 940 nm if it is added with toner, which not only protects the eyes, but also looks more beautiful. The light-transmitting mirror is provided with the camera hole 230 corresponding to the camera and the photosensor 233 corresponding to the photosensor. It should be noted that the photosensor is not a light-emitting lamp, but its main function is to sense the brightness of light in an environment, so that the camera can enter a night vision mode or a normal working mode, and the light is not dazzling to a child and will not harm the eyes of the child.

Figure 3:
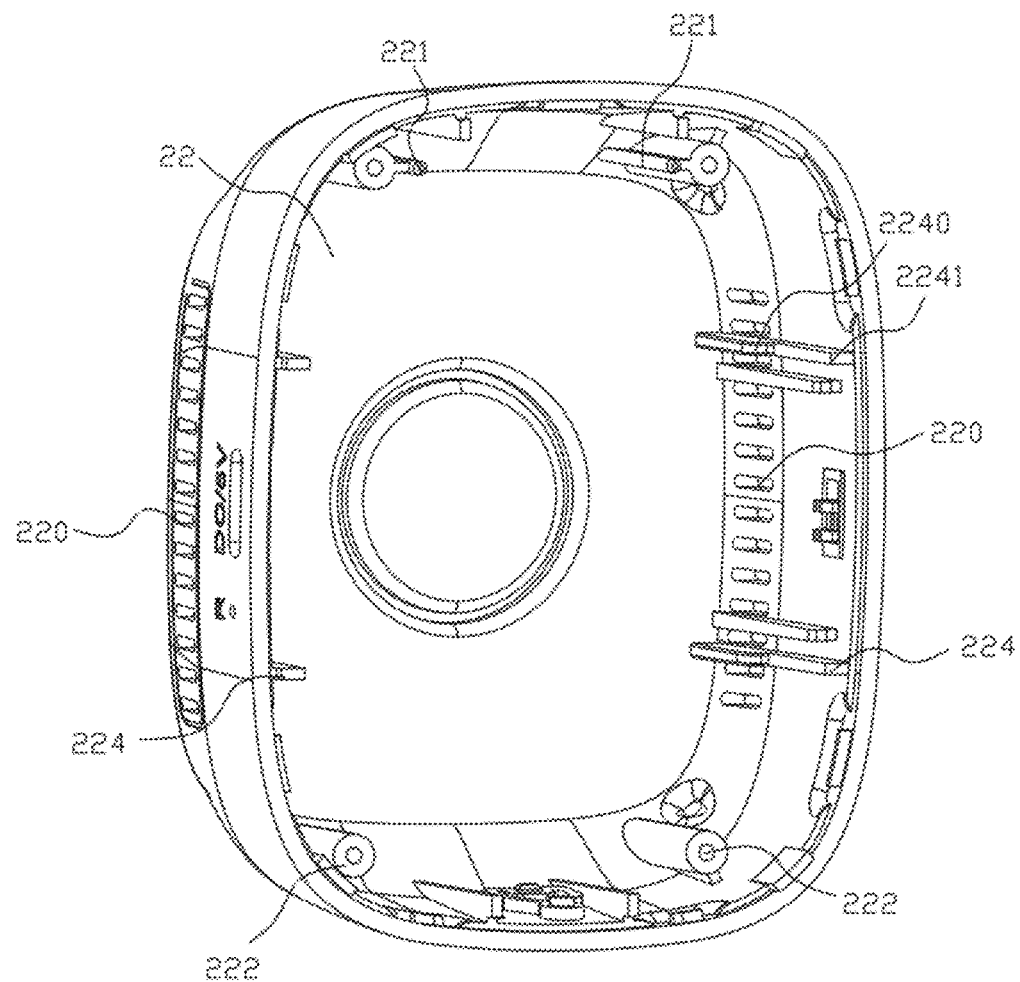
FIG. 3 is a schematic axonometric structural diagram of a front side of a surveillance camera according to a preferred embodiment of the present disclosure.

Further, as shown in FIG. 3, a plurality of limiting ribs 224 are arranged around the bottom shell 22. The limiting ribs include battery limiting ribs 2240 that limit the position of the battery and control board limiting ribs 2241 that limit the control board. The assembling of the product is facilitated by the limitation on the battery and the control board by the limiting ribs. A plurality of control board limiting columns 221 are further arranged in the bottom shell, and the control board is provided with positioning holes 216 corresponding to the limiting columns. The control board is positioned on the bottom shell through the positioning holes and the limiting effect of the control board limiting ribs, which facilitates the assembling of the control board on the bottom shell. A plurality of control board locking columns 222 are further arranged on the bottom shell, and a plurality of fixing holes 215 are correspondingly provided in the control board. The positioned control board is fixed to the bottom shell by a screw. To enhance the heat dissipation effect on the control board and the battery, a heat dissipation hole 220 is further provided in a side surface of the bottom shell, and shock-absorbing cotton (not shown in the figure) is arranged between the bottom shell and the battery, to reduce the impact of shaking on the battery.

Figure 4:
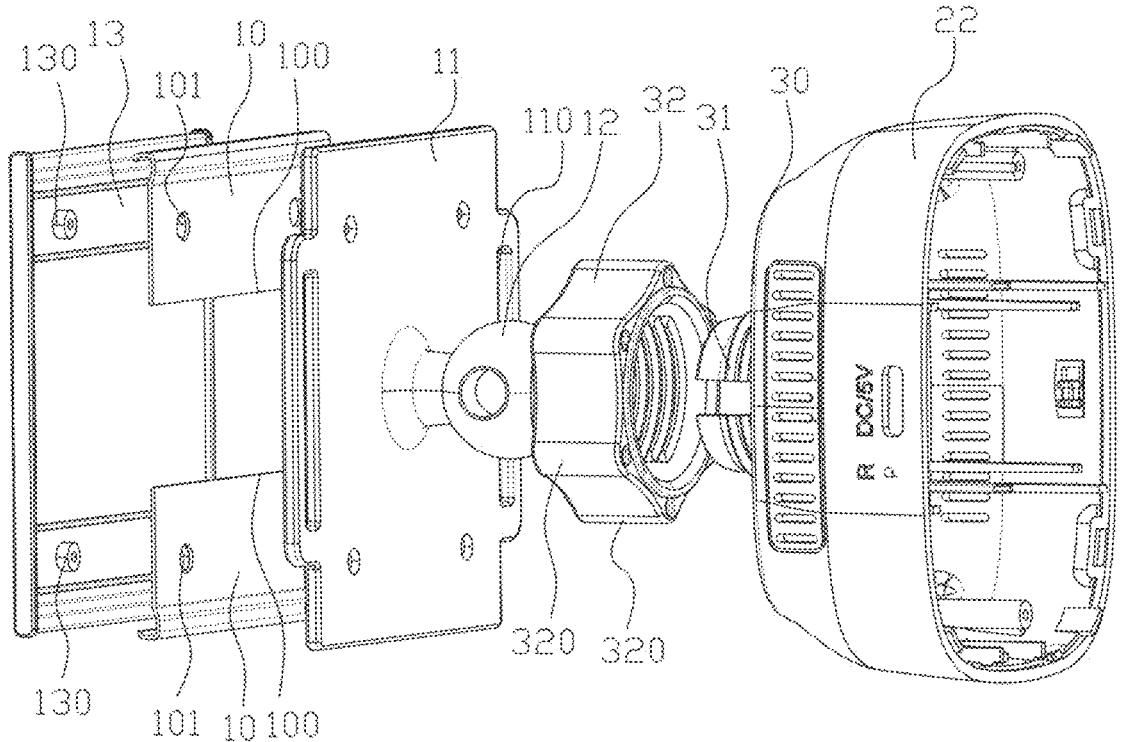
FIG. 4 is an exploded structural diagram of a connecting portion and a fixed assembly of a surveillance camera according to a preferred embodiment of the present disclosure.

Further, as shown in FIG. 2 and FIG. 4, a connector 3 includes: a connecting plate 30, wherein the connecting plate can be selected as a bottom surface of the bottom shell; a connecting corner fixedly arranged on one side of the connecting plate; and a universal ball accommodating chamber 31 fixedly arranged on the other side of the connecting corner. In this case, the universal ball accommodating chamber is integrally formed with the bottom shell. The fixed assembly 1 is provided with a universal ball 12 corresponding to the universal ball accommodating chamber, and a locking nut 32 that locks the universal ball accommodating chamber into which the universal ball is inserted. The connector and the fixed assembly are detachably connected by tightening the locking nut. To facilitate the rotation of the locking nut, a pair of rotating handles 320 are arranged on the locking nut. The rotating handles can be replaced with other structures that are convenient for being tightened and loosened, such as rotating nuts, all of which should fall within the scope of protection of the present disclosure. Meanwhile, the universal ball also facilitates the adjustment on a monitoring angle of the surveillance camera. The present disclosure can adjust a photographing angle within 120°.

Further, as shown in FIG. 1 to FIG. 2 and FIG. 4, the fixed assembly 1 includes a fixed base plate 11, a universal ball 12 arranged on one side of the fixed base plate, a hook and loop fastener adapter plate 13 connected to the other side of the fixed base plate. A hook and loop fastener 10 is adhered to the other side of the hook and loop fastener adapter plate. The hook and loop fastener is fixed on the hook and loop fastener adapter plate and is then fixed on the fixed base plate 11 through a screw. By use of the adhesive property of the hook and loop fastener, the surveillance camera is fixed at a headrest or other positions. As each seat in the vehicle is made of leather, the surveillance camera can be tied to the seat with a fixing strap, and then the hook and loop fastener is adhered to the seat, to take and place the surveillance camera more conveniently at any time. Hanging lugs 110 are arranged on two sides of the fixed bottom plate 11. The surveillance camera can also be fixed on the seat by threading woven tapes through the hanging lugs, to further avoid the surveillance camera from falling off.

Further, as shown in FIG. 4, the hook and loop fastener 10 is arranged on one side of the hook and loop fastener adapter plate 13. An end portion of the hook and loop fastener is folded from one side to the other side. The hook and loop fastener adapter plate is provided with a connecting plate fixing column 130 connected to the fixed base plate, and a through hole 101 passing through the connecting plate fixing column is correspondingly provided in the hook and loop fastener. The connecting plate fixing column is inserted into the through hole, and the hook and loop fastener is fixed more firmly using glue or in another way. Due to the arrangement of the hook and loop fastener adapter plate, the adhesion of the hook and loop fastener is reduced after the hook and loop fastener is used for multiple times, so that another hook and loop fastener adapter plate connected with a hook and loop fastener can be replaced for the hook and loop fastener and connected to the fixed base plate, which is more convenient. It should be noted that in the present disclosure, it is convenient to remove the camera using the hook and loop fastener, or the camera can be fixed on a seat in a vehicle using a woven tape. Alternatively, the hook and loop fastener can be replaced with an automobile clamp to clamp the camera onto a metal column of an automobile headrest, or onto a roof, a center console, an automobile pull handle, a windshield, an air outlet of an air conditioner, or the like, all of which shall fall within the scope of protection of the present disclosure.

Further, the camera of the present disclosure is mainly used for in-vehicle monitoring, for example, monitoring of a baby in a vehicle and monitoring of the inside of a vehicle during vehicle operation. The center console display is powered by an in-vehicle charger, and the camera has a built-in battery. When the vehicle engines off, the center console display is powered off and sends a command to turn off the camera, namely, in accordance with a power-off protocol. When the center console display is powered on, the center console display will instruct the camera to be turned on and automatically connected, namely, in accordance with a power-on protocol. The battery of the present disclosure has a capacity of 3000 milliamperes, with a battery life of up to 20 hours. Monitoring video signals of the camera are wirelessly displayed on the center console display (an independent central control display can be used), and will not occupy an internal memory of a mobile phone. It is convenient for mounting and use. The center console display can achieve split-screen displaying of content monitored by the surveillance camera, perform sleep detection on a child, and magnify monitored image, and can also be applied to short-term monitoring during outing. The control board is provided with a memory card slot that provides a video storage function, so as to view monitored video information. Because the center console display displaying the surveillance camera needs to be connected to the in-vehicle charger for power supplying, if the center console display is kept in a connected state to the in-vehicle charger, control board information cannot be transmitted to the center console display when the vehicle engines off. In this case, the camera will be powered off and shut down. Meanwhile, after the camera is shut down, the driver will be prompted to take away the child in the vehicle through an automatic voice prompt function, thereby reducing the danger that the child is left in the vehicle alone. After the vehicle engines on and the center console display is powered on, the camera is automatically connected to the center console display and is turned on, thereby automatically turning on and turning off the surveillance camera and prolonging the service life of the battery that is in a fully charged state. A battery can also be arranged in the center console display to supply power to the center console display, which shall also fall within the scope of protection of the present disclosure.

It should be understood that the present disclosure is described through some embodiments. Those skilled in the art are aware that various changes or equivalent replacements can be made to these features and embodiments without departing from the spirit and scope of the present disclosure. In addition, under the guidance of the present disclosure, these features and embodiments can be modified to adapt to specific situations and materials without departing from the spirit and scope of the present disclosure. Therefore, the present disclosure is not limited by the specific embodiments disclosed herein, and all embodiments falling within the scope of the claims of the present disclosure shall fall within the scope of protection of the present disclosure.

What is claimed is:

1. A surveillance camera applicable to being used in a vehicle and easily taken and placed, comprising a camera assembly, wherein the camera assembly comprises a bottom shell, and a control board arranged in the bottom shell; the control board is provided with a camera for monitoring; the camera assembly further comprises an outer shell; the outer shell and the bottom shell fix the control board inside the bottom shell; the surveillance camera further comprises a fixed assembly detachably connected to the camera assembly; one side of the fixed assembly is detachably connected to the camera assembly; and the other side of the fixed assembly is detachably connected and fixed in a vehicle to fix the surveillance camera inside the vehicle;

wherein the control board is further provided with a photosensor and a plurality of groups of infrared lamps; the photosensor senses brightness of a monitoring environment to control turning on and turning off of the infrared lamps to activate a night vision function of the surveillance camera; through holes for allowing the infrared lamps and the photosensor to correspondingly pass through are provided in the outer shell; and the camera assembly further comprises a battery for supplying power to the control board;

wherein a lamp housing is connected to an outer side of the outer shell; a light hole for the photosensor to sense a temperature of the monitoring environment is provided in the lamp housing; the outer shell is made of a semi-transparent material; the infrared lamps monitor the night vision function through the lamp housing; limiting ribs for limiting the battery and the control board are arranged in the bottom shell; a positioning hole and a fixing hole which are used for positioning the control board are further provided in the bottom shell; and a heat dissipation hole is provided in a side surface of the bottom shell.

2. The surveillance camera according to claim 1, wherein the fixed assembly is connected to the camera assembly through a connecting portion; the connecting portion is detachably connected to the fixed assembly; and the connecting portion is integrally formed with the camera assembly.

3. The surveillance camera according to claim 2, wherein the connecting portion is detachably connected to the fixed assembly through a universal ball; the universal ball enables the camera assembly to rotate relative to the fixed assembly, to adjust a monitoring angle of the camera; the connecting portion further comprises a rotating nut that locks the universal ball; two rotating handles are arranged on the rotating nut; and the rotating nut is tightened or loosened through the rotating handles.

4. The surveillance camera according to claim 1, wherein the fixed assembly comprises a fixed base plate; one side of the fixed base plate is detachably connected to the camera assembly; and a detachable connector is arranged on the other side of the fixed base plate to fix the fixed assembly in the vehicle.

5. The surveillance camera according to claim 2, wherein the fixed assembly comprises a fixed base plate; one side of the fixed base plate is detachably connected to the camera assembly; and a detachable connector is arranged on the other side of the fixed base plate to fix the fixed assembly in the vehicle.

6. The surveillance camera according to claim 3, wherein the fixed assembly comprises a fixed base plate; one side of the fixed base plate is detachably connected to the camera assembly; and a detachable connector is arranged on the other side of the fixed base plate to fix the fixed assembly in the vehicle.

7. The surveillance camera according to claim 4, wherein the other side of the fixed base plate fixes the fixed assembly in the vehicle through a hook and loop fastener, a clip, or a strap; hanging lugs are further arranged at a left end and a right end of the fixed base plate; and the fixed assembly is fixed in the vehicle through the hanging lugs or the strap.

8. The surveillance camera according to claim 7, wherein the hook and loop fastener is fixed on the fixed base plate through a hook and loop fastener adapter plate; the hook and loop fastener is adhered to the hook and loop fastener adapter plate; and the hook and loop fastener adapter plate is detachably connected to the fixed base plate.

9. A center console display used in conjunction with the surveillance camera according to claim 1, wherein the center console display communicates with the surveillance camera through wireless connection; and the center console display is placed on a center console for a driver to view images monitored by the surveillance camera in real time.

10. A center console display used in conjunction with the surveillance camera according to claim 2, wherein the center console display communicates with the surveillance camera through wireless connection; and the center console display is placed on a center console for a driver to view images monitored by the surveillance camera in real time.

11. A center console display used in conjunction with the surveillance camera according to claim 3, wherein the center console display communicates with the surveillance camera through wireless connection; and the center console display is placed on a center console for a driver to view images monitored by the surveillance camera in real time.

12. A center console display used in conjunction with the surveillance camera according to claim 4, wherein the center console display communicates with the surveillance camera through wireless connection; and the center console display is placed on a center console for a driver to view images monitored by the surveillance camera in real time.

13. A center console display used in conjunction with the surveillance camera according to claim 5, wherein the center console display communicates with the surveillance camera through wireless connection; and the center console display is placed on a center console for a driver to view images monitored by the surveillance camera in real time.

14. A center console display used in conjunction with the surveillance camera according to claim 6, wherein the center console display communicates with the surveillance camera through wireless connection; and the center console display is placed on a center console for a driver to view images monitored by the surveillance camera in real time.

15. A center console display used in conjunction with the surveillance camera according to claim 7, wherein the center console display communicates with the surveillance camera through wireless connection; and the center console display is placed on a center console for a driver to view images monitored by the surveillance camera in real time.

16. A center console display used in conjunction with the surveillance camera according to claim 8, wherein the center console display communicates with the surveillance camera through wireless connection; and the center console display is placed on a center console for a driver to view images monitored by the surveillance camera in real time.

\* \* \* \* \*